United States Patent
Yoshimoto et al.

(10) Patent No.: US 11,875,694 B2
(45) Date of Patent: Jan. 16, 2024

(54) OPERATIONAL INFORMATION MANAGEMENT SYSTEM AND WEARABLE SENSOR

(71) Applicant: Hitachi, Ltd., Tokyo (JP)

(72) Inventors: Hiroyuki Yoshimoto, Tokyo (JP); Tetsuya Ishimaru, Tokyo (JP); Nobuyuki Sugii, Tokyo (JP); Yoshihiro Wakisaka, Tokyo (JP); Noriyuki Haga, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1181 days.

(21) Appl. No.: 16/549,674

(22) Filed: Aug. 23, 2019

(65) Prior Publication Data

US 2020/0126447 A1 Apr. 23, 2020

(30) Foreign Application Priority Data

Oct. 17, 2018 (JP) ................................ 2018-195469

(51) Int. Cl.
G09B 19/00 (2006.01)
A41D 19/00 (2006.01)
G01D 7/08 (2006.01)
G01D 21/02 (2006.01)

(52) U.S. Cl.
CPC ....... G09B 19/003 (2013.01); A41D 19/0027 (2013.01); G01D 7/08 (2013.01); G01D 21/02 (2013.01)

(58) Field of Classification Search
CPC ...... A41D 19/0027; G01D 21/02; G01D 7/08; G09B 19/003
See application file for complete search history.

(56) References Cited

FOREIGN PATENT DOCUMENTS

| BR | 102013033429 A2 * | 7/2015 | ............. G06Q 50/10 |
|---|---|---|---|
| JP | 2007-72724 A | 3/2007 | |
| JP | 2011-159204 A | 8/2011 | |
| JP | 2014-117328 A | 6/2014 | |
| KR | 20150054560 A * | 5/2015 | |

OTHER PUBLICATIONS

Japanese-language Office Action issued in Japanese Application No. 2018-195469 dated Feb. 1, 2022 with English translation (six (6) pages).
English translation of document B1 (JP 2011-159204 A filed on Aug. 23, 2019) (26 pages).

* cited by examiner

*Primary Examiner* — Kesha Frisby
(74) *Attorney, Agent, or Firm* — Crowell & Moring LLP

(57) ABSTRACT

An operation motion is accurately determined in an operational information management system. The system includes a motion verification portion that combines and verifies plurality of pieces of sensor information and recognizes a specific body motion, a signal determination portion that determines whether an operation content of an operator is correctly performed based on the body motion recognized by the motion verification portion, and a report portion that reports a determine result of the signal determination portion.

13 Claims, 9 Drawing Sheets

OPERATIONAL INFORMATION MANAGEMENT SYSTEM AND WEARABLE SENSOR

BACKGROUND

The present invention relates to an operational information management system and a wearable sensor.

An inspection process detects whether an operation is correctly made to reduce failures and improve qualities in an operation site such as an assembly plant, and this is important. In particular, a human error may occur in an operation not by machinery but by a human. For this reason, in many cases, another inspector or an inspection device performs confirmation immediately after an operation or after multiple operations in many cases. Such confirmation includes screwing, electrical wiring using a connector, painting, or attachment of parts, for example.

Japanese Unexamined Patent Application Publication No. 2011-159204 describes an automatic detection system that automatically performs confirmation without a human such as an inspector. Specifically, Japanese Unexamined Patent Application Publication No. 2011-159204 describes an operation determination system having a position sensor and a pressure sensor in assembly of mating parts.

SUMMARY

In many cases, detections of operations are difficult even in an automatic detection system in operation sites and production sites.

For example, an operation by a person in an operation site is repeated as in an assembly line operation but is not repeated each time as the same operation such as a mechanical operation. Leg motions and contacts with objects by the hand are slightly changed each time. Many exceptional motions are also generated.

It is difficult to accurately determine such complicated operational motions by using a single sensor signal. Japanese Unexamined Patent Application Publication No. 2011-159204 describes a position sensor and a pressure sensor but does not describe that motion determination is made by combining multiple sensor signals. As a result, it is difficult for the operation determination system of Japanese Unexamined Patent Application Publication No. 2011-159204 to accurately determine operational motions.

An object of the present invention is to accurately determine operational motions in an operational information management system.

An operational information management system of one aspect of the present invention includes: multiple sensors mounted to a body of an operator and outputting multiple pieces of sensor information about a motion of the body acting on an operation target through contact with the operation target by the body; a motion verification portion that combines and verifies the multiple pieces of sensor information to recognize a specific body motion; a signal determination portion that determines whether an operation content of the operator is normally performed based on the body motion recognized by the motion verification portion; and a report portion that reports determination results of the signal determination portion.

A wearable sensor of one aspect of the present invention is a glove shaped wearable sensor worn by an operator includes multiple sensors mounted to the hand of the operator and outputting multiple pieces of sensor information signals about a motion of the hand acting on an operation target through contact with the operation target by the hand. The multiple sensors time synchronize the multiple sensor information signals as a single wireless signal and wirelessly transmits the single wireless signal to the outside.

According to one aspect of the present invention, operational motions can be accurately determined in an operational information management system.

DETAILED DESCRIPTION

Figure 1:
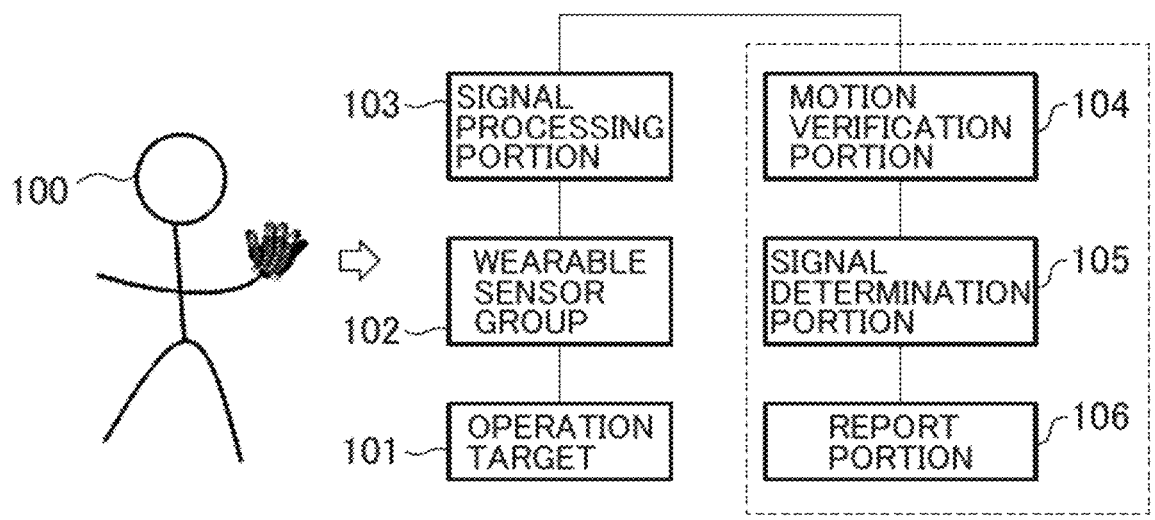
FIG. 1 illustrates a structure of an operational information management system.

Hereafter, the embodiment is described in detail in reference to the drawings.

First Embodiment

An operational information management system of the first embodiment is explained in reference to FIGS. 1 to 4.

In the operational information management system of the first embodiment, when an operator 100 operates an operation target 101 to be sensed, a wearable sensor group 102 worn by the operator 100 senses information about the operation target 101. The wearable sensor group 102 includes multiple sensors.

Analog sensing values such as current values and electric resistances are digitized by a signal processing portion 103 and transmitted to a motion verification portion 104. The motion verification portion 104 identifies a content of an operation performed by an operator from sensor signals transmitted from the signal processing portion 103. When the motion verification portion 104 identifies an operation of the operator, a signal determination portion 105 determines whether the operation is standard.

The result determined by the signal determination portion 105 is reported to a report portion 106. The wearable sensor group 102 worn by the operator 100 has a glove shaped shape and contains sensing equipment. The wearable sensor group 102 may have a cap shape attached to the fingertip or a shape that covers the palm or the back of the hand.

By gripping the operation target 101 to be sensed by the tips of the hand, contacting the surface of the operation target 101, or pressing the operation target 101 by part of the hand, information about a pressure, a sound, or an acceleration at the time of contacting the operation target 101 is acquired. The operation target 101 may be a tool or an electrical machine used by the operator for operation. The operation target 101 may be an assembly part. The operation target 101 may be a cart as a handcart or a food such as a fruit. The signal processing portion 103, motion verification portion 104, signal determination portion 105, and report portion 106 may be integrated within the wearable sensor group 102 or may be connected to the wearable sensor group 102 via wiring via which power source or electrical signals are transmitted or received.

The operational information management system of the first embodiment includes: the wearable sensor group 102 that includes multiple sensors and that is worn by the body of the operator 100 to output multiple pieces of sensor information about motions of the body contacting and acting on the operation target 101; the motion verification portion 104 that combines and verifies multiple pieces of information to recognize a specific body motion; the signal determination portion 105 that determines whether an operation content of the operator 101 is correctly made based on the body motion recognized by the motion verification portion 104, and the report portion 106 that reports determination results of the signal determination portion 105.

The operational information management system of the first embodiment further includes the signal processing portion 103 that processes multiple pieces of sensor information to generate multiple digitized sensor information signals by processing multiple pieces of sensor information. The motion verification portion 104 recognizes a specific body motion by combining multiple sensor information signals generated in the signal processing portion 103. The signal determination portion 105 determines whether an operation of the operator 101 is successfully performed by comparing a body motion around a motion time verified by the motion verification portion 104 to a predefined body motion. The report portion displays a determination result of the signal determination portion 105.

Figure 2:
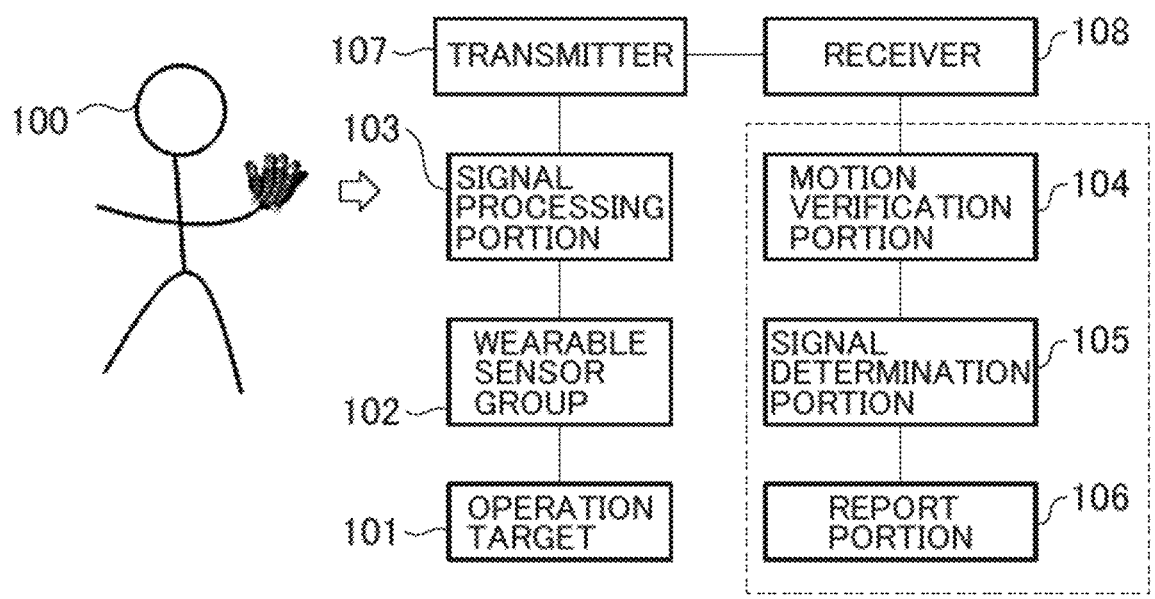
FIG. 2 illustrates a structure of an operational information management system having a wireless transmission and reception function.

As in FIG. 2, a transmitter 107 and a receiver 108 are provided between the signal processing portion 103 and motion verification portion 104. The transmitter 107 transmits signals wirelessly transmitted from the signal processing portion 103. The remotely located receiver 108 receives these signals. For example, the transmitter 107 may transmit signals to the motion verification portion 104 and the signal determination portion 105 which are processing systems on a PC.

Figure 3:
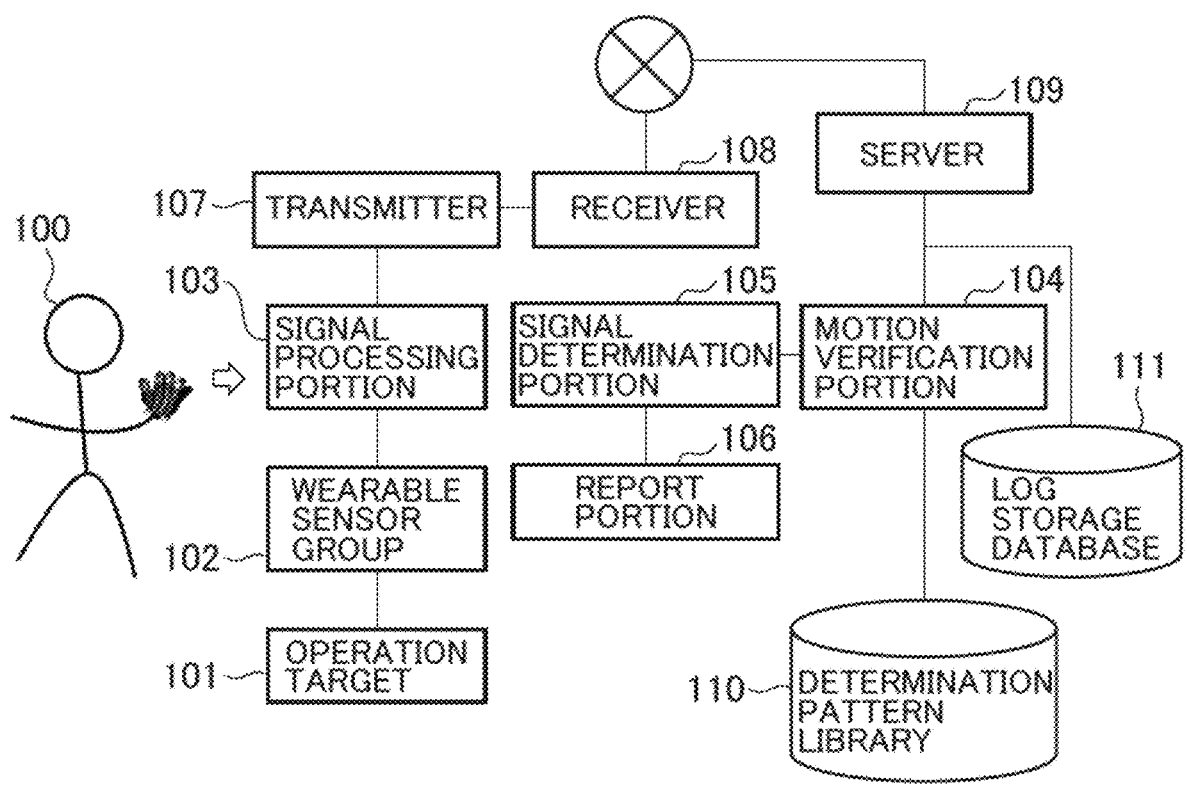
FIG. 3 illustrates a system structure of an operational information management system having a server, a log storage database, and a determination library.

As in FIG. 3, the signals received by the receiver 108 may be transmitted to a server 109 via the Internet in the wired or wireless manner. These signals may be then transmitted to a log storage database 111 and the motion verification portion 104. The motion verification portion 104 may verify a motion by comparing data of a verification pattern previously present as a library such as a determination pattern library 110 to acquired data.

The log storage database 111 may be stored in an electronic medium or printed to a print medium and stored. For example, the content reported by the report portion 106 may include only a result such as OK or NG determined by the signal determination portion 105.

The report portion 106 may only process data of a motion identified by the motion verification portion 104 to report and display the data. In this case, an operator or other persons such as a supervisor determine signals while seeing data processed as a graph. The signals of an operation executed by the operator 100 in real time may be graphed and simultaneously displayed.

The motion verification portion 104 may set, as a determination item, identification of an operation by the signal determination portion 105. In this case, the motion verification portion 104 and the signal determination portion 105 are integral and inseparable.

Here, the report portion 106 may display only visual information or a combination of audio information and tactile information such as sound and vibration when including a function of reporting determination results in the signal determination portion 105. The report portion 106 may be a feedback portion that transmits information from the signal determination portion 105 to an operator or a supervisor as visual, audio, and tactile information.

Figure 4:
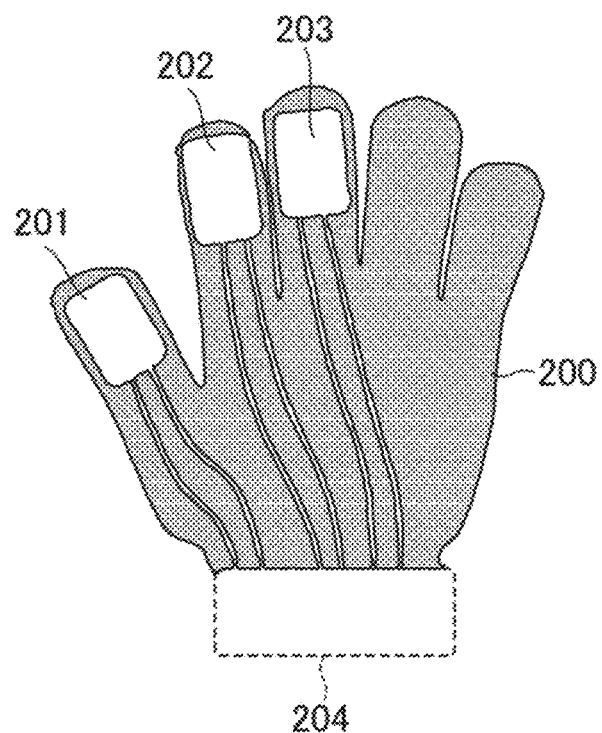
FIG. 4 illustrates an example of a glove shaped wearable sensor having a microphone and a pressure sensor.
Figure 5:
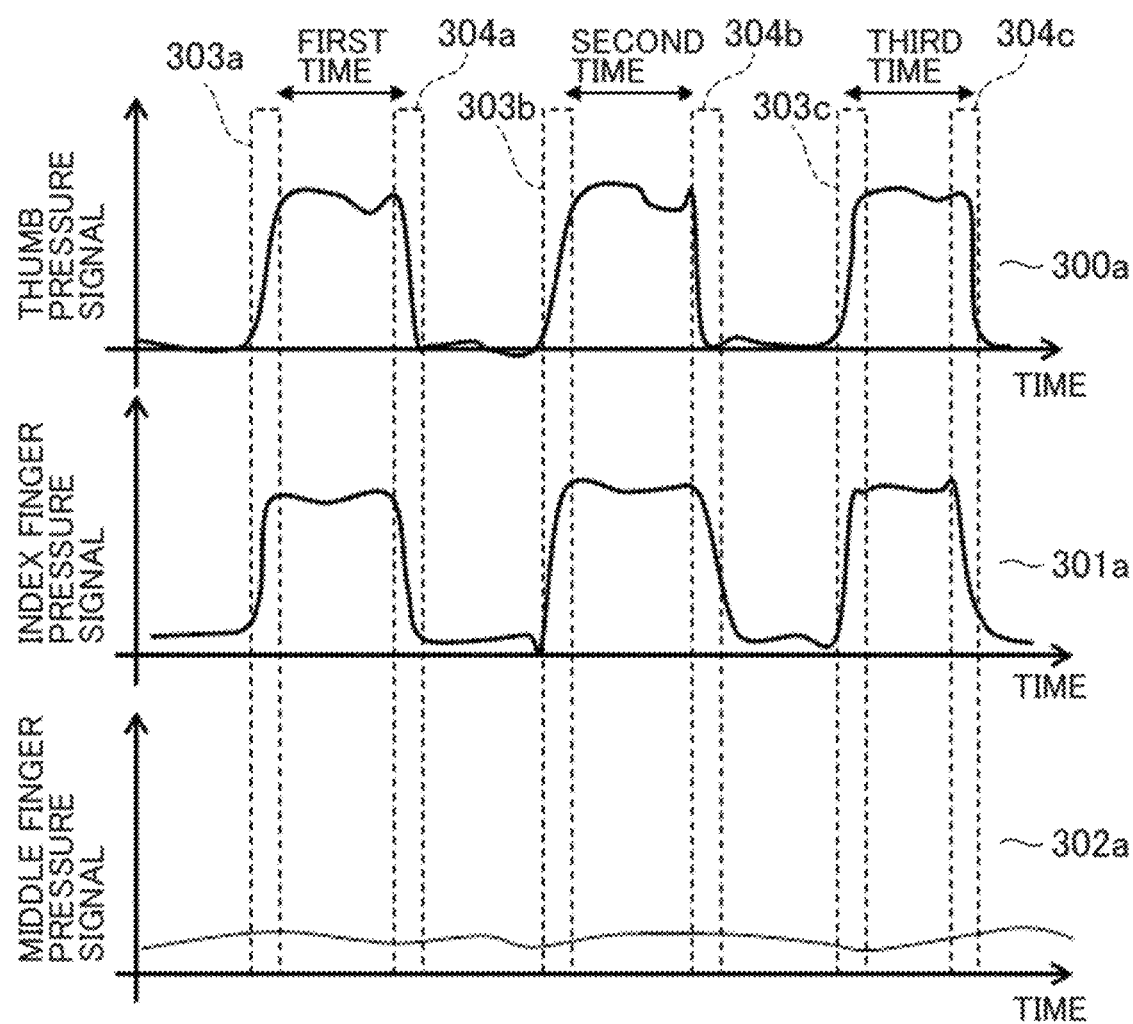
FIG. 5 illustrates an example of a fingertip pressure signal of an operator in an operation using the thumb and the index finger.
Figure 6:
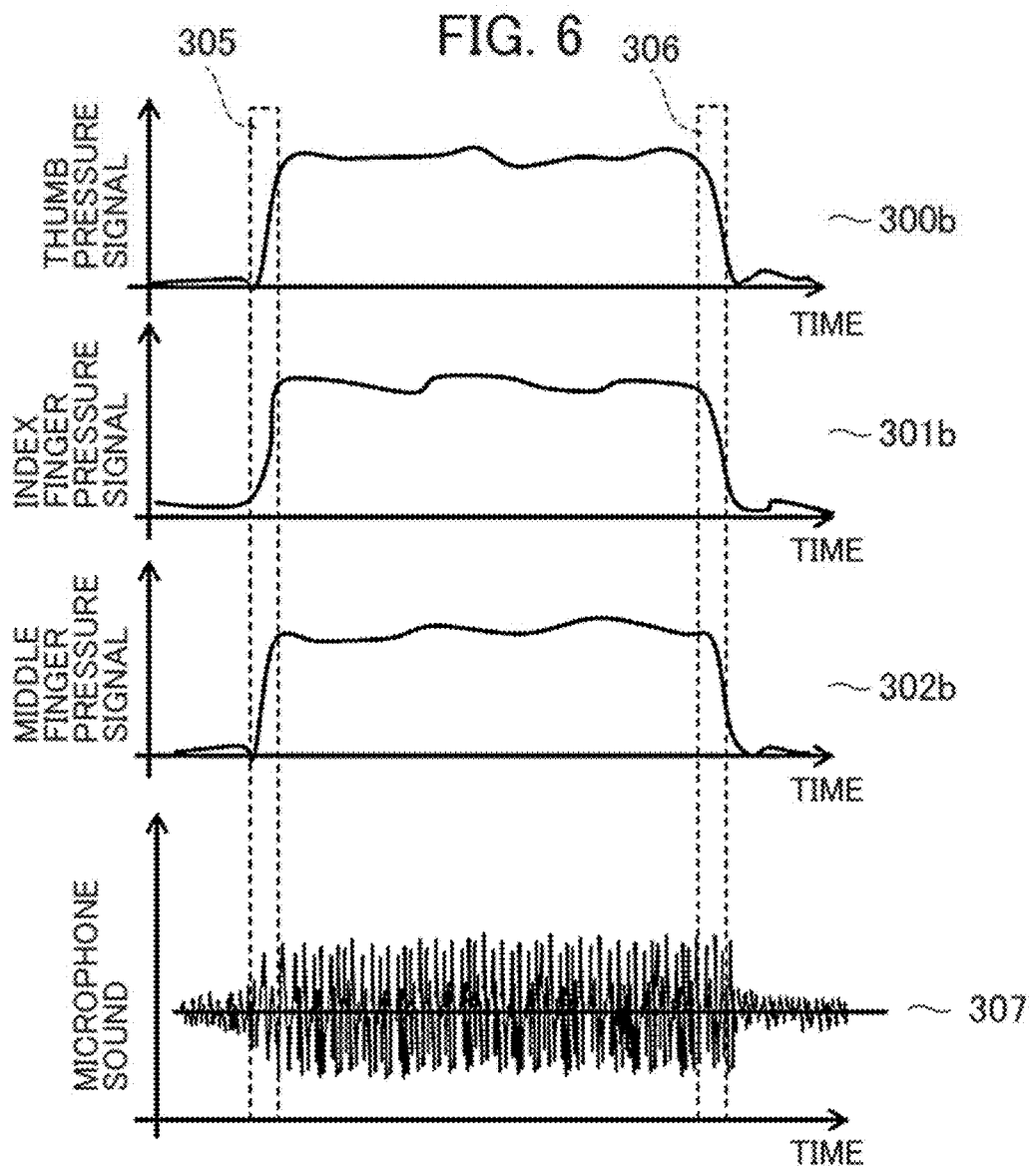
FIG. 6 illustrates an example of signals of a fingertip pressure and an operation sound of an operator carrying and operating an operation target that emits sound.

In reference to FIGS. 4 to 6, a technique of identifying and determining operations in the motion verification portion 104 and the signal determination portion 105 is explained.

An example of a glove shaped wearable sensor 200 is illustrated in FIG. 4. Pressure sensors 200, 201, and 202 are built in the positions of the thumb, index finger, and middle finger of the glove shaped wearable sensor 200, respectively. A microphone 204 is built in the wrist position.

An example of pressure signals of operations using the glove shaped wearable sensor 200 is illustrated in FIG. 5.

Signal values 300a, 301a, and 302a of FIG. 5 are acquired from the positions of the thumb, index finger, and middle finger of the glove shaped wearable sensor 200 of FIG. 4. The target operator 100 repeats operations to assemble assembly parts having the same shape three times with the thumb and index finger.

When high pressure is applied to the fingertips at times 303a, 303b, and 303c at which the part is gripped by the fingers, high pressure values are detected on the thumb and index finger. In contrast, a characteristic pressure is not detected because the part is not gripped by the middle finger. When the fingers are released from the part after assembling the part, the pressure values rapidly decrease at times 304a, 304b, and 304c. The motion verification portion 104 detects that two pressure values of only the thumb and index finger in the three types of pressure signals synchronously increase at a certain time and synchronously decrease after remaining high for a certain time. The motion verification portion 104 then identifies a motion of the assembly that is made at one time.

The signal determination portion 105 may determine whether an assembly is made three times, whether one assembly is made within a predetermined time, or whether an interval between multiple assemblies is within a predetermined time.

FIG. 6 illustrates another example of a technique of identifying and determining an operation using the glove shaped wearable sensor 200 of FIG. 4.

Similar to FIG. 5, signal values 300b, 301b, and 302b of FIG. 6 are respectively acquired from the positions of the thumb, index finger, and middle finger of the glove shaped wearable sensor 200 of FIG. 5. A sound signal 307 is acquired from a built-in microphone. Herein, the target operator 100 performs an operation with a tool such as a motorized driver for a predetermined time.

At this time, when the operator 100 grasps the tool at a time 305, the pressure values of the thumb, index finger, and middle finger rise together. A characteristic sound of the operation is also simultaneously detected from the microphone 204. Then, at a time 306, the pressure values of the thumb, index finger, and middle finger fall together. At the same time, the characteristic sound acquired by the microphone 204 is also lost.

At this time, the motion verification portion 104 detects simultaneous rising of the three types of pressure signals at a certain time and detects the characteristic sound from the microphone 204. After a given time period, the motion verification portion 104 detects that the high pressures and characteristic sound are simultaneously lost. Then, the motion verification portion 104 identifies the operation using the tool. A characteristic sound may be detected from the microphone sound 307 by using an intensity at a specific frequency of a sound. The signal determination portion 105 may use a duration of an operation, a grip strength of a finger, or an abnormal sound mixed with a sound during an operation as a determination target.

An operational information management system of the second embodiment can identify operational information about an operator by combining signals of multiple sensors. It is difficult to identify this operational information with a single sensor. Thus, it is possible to determine an operation by identifying operational information about an operator.

Second Embodiment

The operational information management system of the second embodiment is explained below. The second embodiment is one example of the first embodiment and relates to a technique of wireless transmission of the transmitter 107.

The wearable sensor group 102 includes multiple sensor data. Data wirelessly transmitted using multiple frequencies or different communication forms are received by the receiver 108 and then transmitted to the signal determination portion 105.

At this time, difference in time may occur in each sensor data due to difference in timing of transmission and reception of different wireless data. Thus, for example as in FIG. 6, when times of multiple sensor data such as sounds and pressures are out of synchronization, it may be difficult for the motion verification portion 104 to successfully identify an operation.

According to the second embodiment, to prevent misalignment in time synchronization between multiple sensors, multiple sensor signals are combined into a composite signal and transmitted and received as a single wireless signal.

Figure 7:
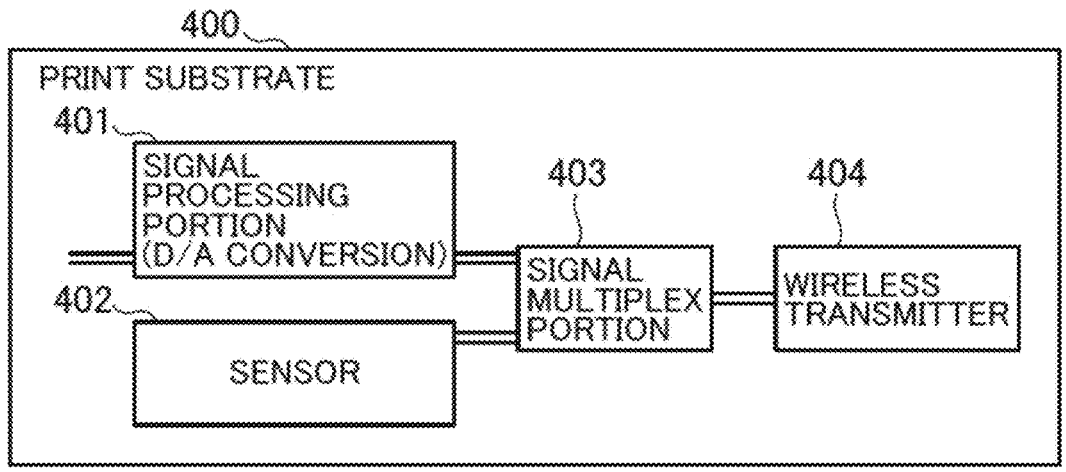
FIG. 7 illustrates an example of IC arrangement on print substrate for transmitting different sensor signals by a single wireless.

As an example of this technique, signals from multiple sensors 401, 402 arranged on a print substrate as in FIG. 7 are once transmitted to a signal combination portion 403 and transmitted from a wireless transmitter 404 after combined. At this time, the signal combination portion 403 may be arranged as a single IC chip as in FIG. 7.

After multiple signals are transmitted to an IC of the transmitter 107 via electrical signals on wiring, the multiple signals may be combined as a single wireless signal in the IC. After that, data is provided with time information in the transmitter 107 or the motion verification portion 104. The data is decomposed to each sensing signal, by which a motion is verified.

According to the operational information management system of the second embodiment, misalignment of time synchronization between multiple sensors is cancelled to accurately identify operational information about an operator and to thus determine an operation.

Third Embodiment

An operational information management system of the third embodiment is explained below using FIG. 8 and FIG. 9.

The third embodiment relates to a technique of identifying a motion of the operator 100 in the motion verification portion 104 of the first and second embodiments.

Figure 8:
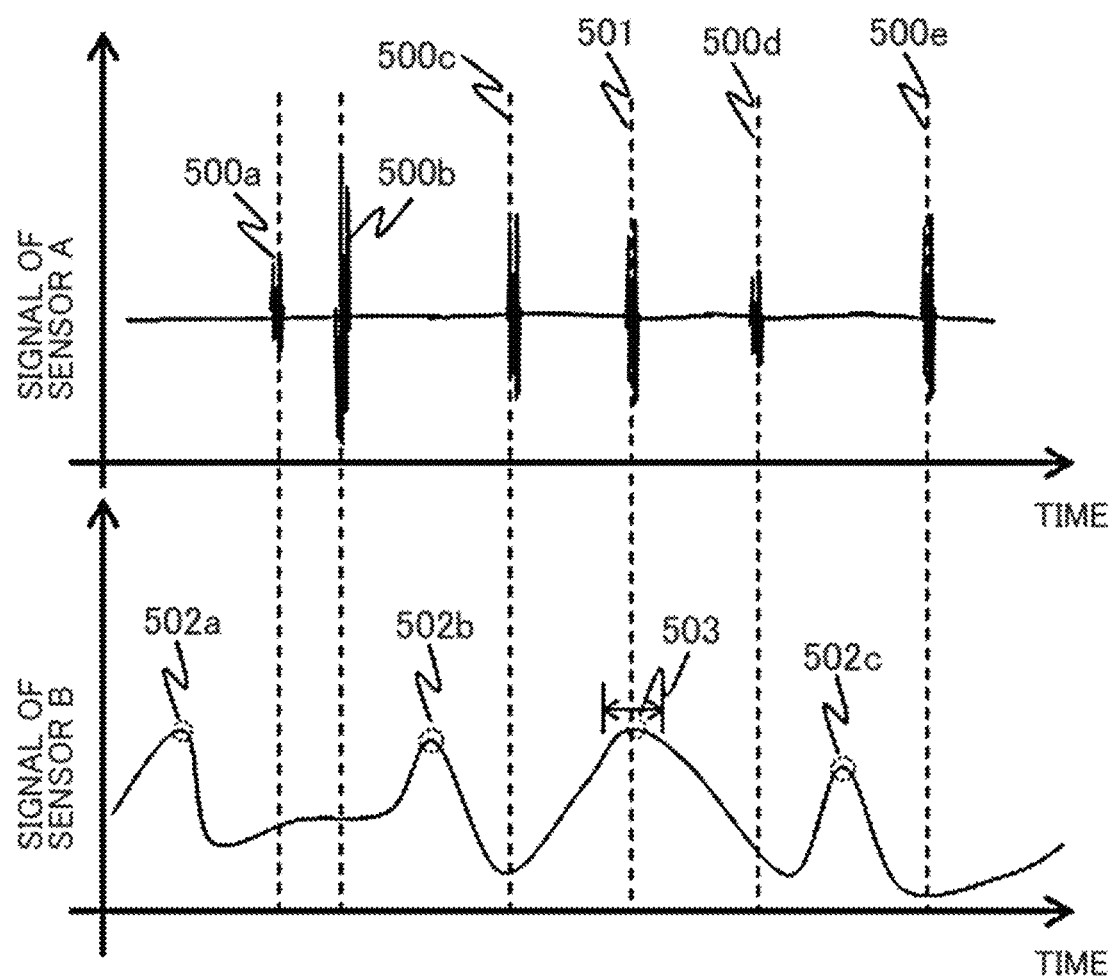
FIG. 8 illustrates an example of characteristic signals generated in different sensors at timing.

FIG. 8 illustrates time variations in signals of a sensor A and a sensor B. The horizontal axis indicates a time. The vertical axis indicates a sensing value. The signals of the sensor A and sensor B include a sound acquired from the microphone 204 and a pressure signal acquired from a fingertip operation. The sensor A detects a characteristic signal at 500a, 500b, 500c, 500d, 500e, and 501 to identify an operation. At this time, signals at other than 501 are noises having an extremely similar characteristic to a signal to be actually detected.

Motions cannot be successfully identified by extracting the signal at 501 only from the signals of this sensor A. Similarly, the sensor B detects a characteristic signal at 502a, 502b, 502c, and 503 to identify an operation. This characteristic signal is the local maximum of the signal values in the time series as one example in FIG. 8. Like the sensor A, motions cannot be accurately identified by extracting the signal at 502 from only the signals of the sensor B.

At this time, the characteristic signals of the sensors A, B are combined for the determination. As illustrated in 501 of FIG. 8, a specific motion of the operator 100 is caused by the characteristic signals of the sensor A and sensor B. The time at which two signals occur at the same timing is found to identify the time at which the motion of the operator 100 occurs.

Figure 9:
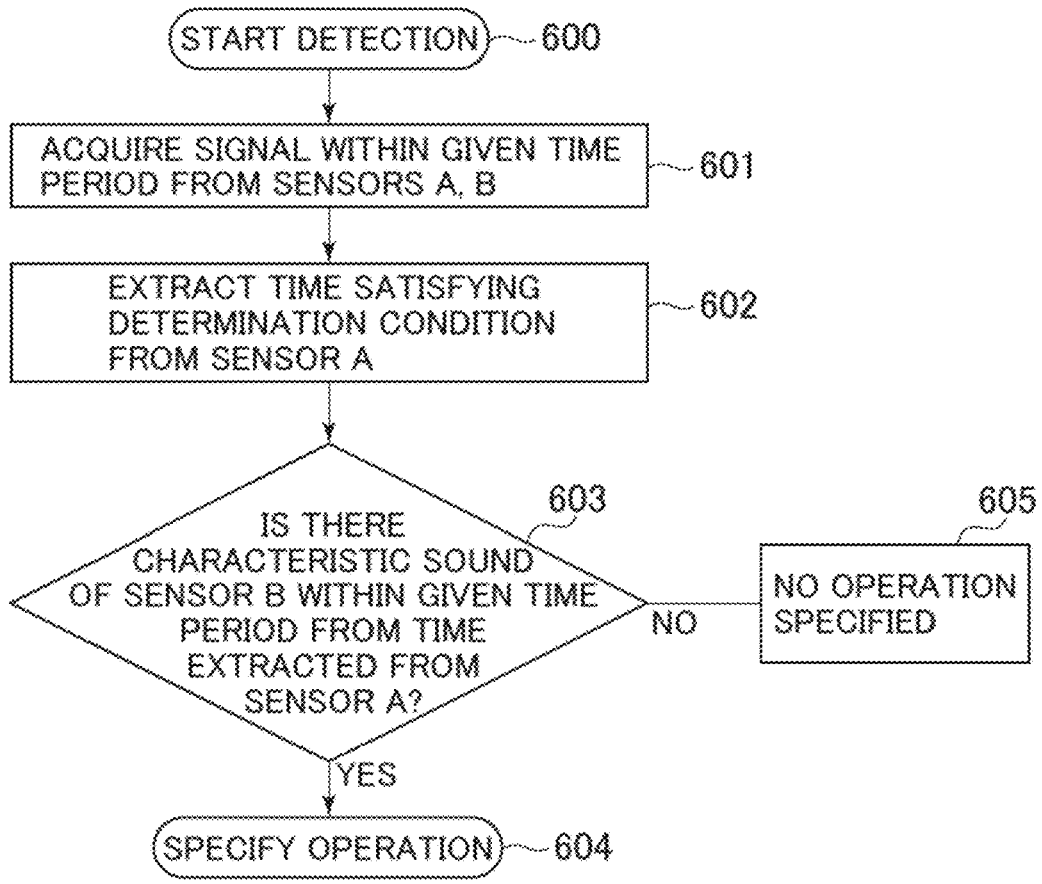
FIG. 9 illustrates a flowchart of an example of a procedure for identifying a motion of an operator when characteristic signals in different sensors are detected at the same timing.

A detection procedure of a characteristic motion of the operator is explained in reference to a flowchart 600 of FIG. 9.

First, data within a predetermined range are acquired from the sensors A and B. That is, signals during a fixed time are acquired from the sensors A and B (S601). The signals may be data acquired at a fixed time such as two seconds before the current time for the operator 100. The operator 100 performs an operation with wearing the wearable sensor 200. The signals may be all operation data when the operator 100 has finished an operation and the data has been recorded.

Next, a time that satisfies a determination condition is extracted from the signals of the sensor A (S602). The accuracy of the extraction at this time is about a frequency of the signal of the sensor A. The accuracy of a time is 0.1 ms when a data point is acquired at the frequency of 10 kHz.

The characteristic signal of the sensor B is searched for in a fixed range of the characteristic signal acquisition time determined in the sensor A, for example, in 100 ms. That is, it is determined whether the characteristic signal of the sensor B is present in a fixed time range from the time extracted by the sensor A (S603).

When the characteristic signal of the sensor B is present, it is determined that there is a specific motion (S604). When the characteristic signal of the sensor B is absent, it is determined that there is no specific motion (S605).

In the third embodiment, the motion verification portion 104 uses signal times of the two types of sensors. The types of sensors are not limited to two types. By extracting signals that may be generated due to a specific motion of an operator from more sensors, multiple sensors may detect characteristic signals at the same timing to identify a motion.

In addition, all the multiple sensors may not detect characteristic signals. For example, any one or two of the sensor A, the sensor B, and a sensor C may detect characteristic signals.

The multiple sensors may include a sound sensor, a pressure sensor, or an acceleration sensor. The same type sensors may be mounted to different positions on the wearable sensor 200. These both cases may be combined.

According to the operational information management system of the third embodiment, even when many noises mix in sensor data and it is thus difficult to identify a motion, a motion of the operator 100 can be accurately identified from the sensor data.

Fourth Embodiment

An operational information management system of the fourth embodiment is explained below. The fourth embodiment relates to the motion verification portion 104 and the signal determination portion 105.

A determination reference is a detection of a characteristic signal from a specific sensor. When many noises mix in a characteristic signal to be detected like the signal of the sensor A of FIG. 8, it is difficult to detect a correct signal. At this time, the combination of multiple sensors explained in the third embodiment removes noise signals.

According to the operational information management system of the fourth embodiment, it is possible to detect a characteristic signal required for determination in the signal determination portion 105.

Fifth Embodiment

An operational information management system of the fifth embodiment is explained below. The fifth embodiment relates to a technique of synchronizing times between the glove shaped wearable sensors 200 worn by the operator 100.

In the first embodiment, the times of different sensors may be slightly misaligned with each other. The synchronized times are compensated using motions previously determined to be simultaneously occur from characteristics of operations of the operator 100. This technique is explained using FIG. 8.

The signal 501 of the sensor A of FIG. 8 and the signal 503 of the sensor B of FIG. 8 occur at the generally same timing. The signal 501 and the signal 503 are determined to simultaneously occur from characteristics of motions of the operator 100. At this time, misalignment of time synchronization inside the system is calculated from slight time misalignment.

According to the operational information management system of the fifth embodiment, it is possible to accurately identify and determine motions of the operator in the motion verification portion 104 and the signal determination portion 105.

Sixth Embodiment

An operational information management system of the sixth embodiment is explained below. The sixth embodiment relates to an application of the first to fourth embodiments.

When the operator 100 assembles a part to another part and a sound generates at this assembly, the glove shaped wearable sensor and operational information management system are used to determine whether the assembly is correctly made.

According to the operational information management system of the sixth embodiment, an operation sound and an operation motion are detected to enable the determination whether the operator 100 performs a correct assembly.

Seventh Embodiment

An operational information management system of a seventh embodiment is explained below. The seventh embodiment relates to a specific application and an application technique in the sixth embodiment.

Multiple electrical wires called a wire harness are collected using a band in a machine tool, automobile, aircraft, and many other electric devices. An electrical wire part including a connector that connects one or more electrical wires at one time is attached to the end portion of the collected wires.

Figure 10:
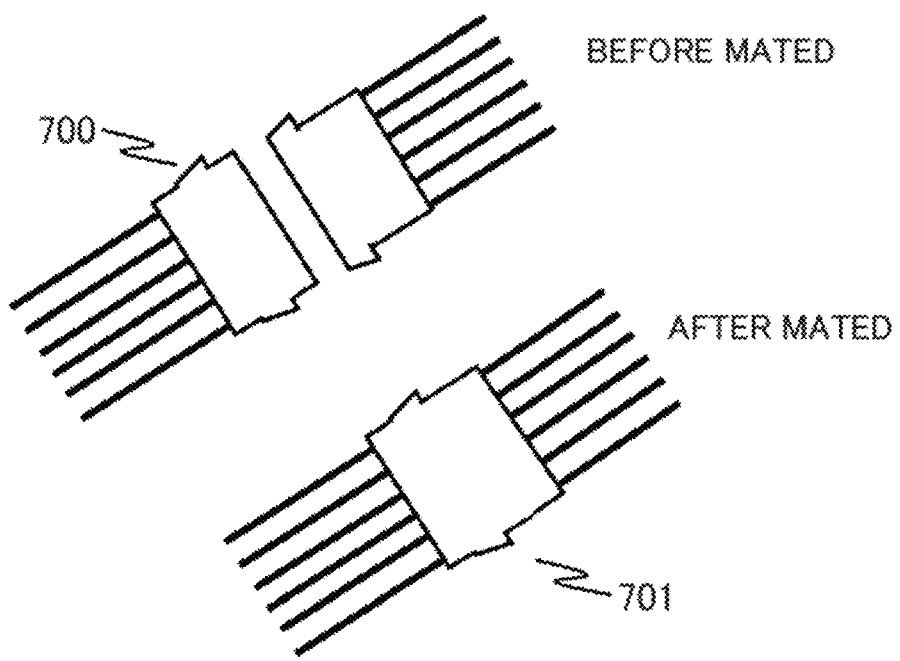
FIG. 10 is a schematic view of an example of a harness connector.

As one example in a schematic view of 700, 701 of FIG. 10, the connector of the end of this wire harness has a ratchet shape and allows easy manual connection in many cases. Once connected, this wire harness is not easily detached even due to vibration or external contact of an object.

In many cases, this harness connector emits a characteristic sound from the connector portion at attachment. According to the seventh embodiment, the technique of the sixth embodiment is used to detect whether this harness connector is attached appropriately.

As an example, a characteristic sound and a fingertip pressure are detected by the sensors to identify the mating operation with the techniques of FIG. 8 and FIG. 9. The characteristic sound is emitted at the attachment of the connector. The fingertip pressure has the local maximum just when the mating sound is emitted because the strongest force is applied to the fingertip at the attachment of the connector.

In the operational information management system of the seventh embodiment, sensing information is not limited to sounds and pressures. For example, the combination of an acceleration sensor and a vibration sensor may be used. In this case, for example, a strong change in acceleration or a characteristic vibration is generated at the moment of mating and combined with a sound or a pressure value to perform detection.

According to an operational information management system of the seventh embodiment, even when many confusing noises are generated around and the operator performs many motions confused with a mating motion, it is possible to detect whether the operator performs correct mating of connectors.

Eighth Embodiment

A wearable sensor of the eighth embodiment is explained below. The eighth embodiment relates to a structure of the glove shaped wearable sensor 200 worn by the operator 100.

Figure 11:
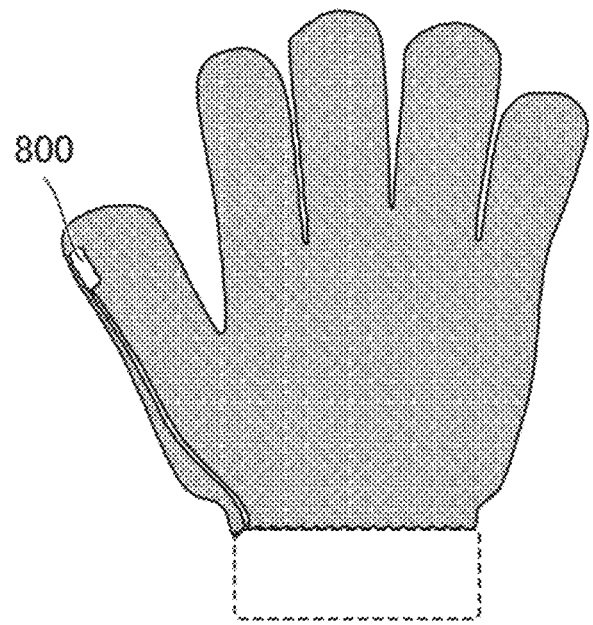
FIG. 11 illustrates an example of a wearable sensor that builds a microphone in the thumb fingertip.

In the eighth embodiment, a compact microphone is built in the fingertip in the glove shaped wearable sensor 200. This microphone may be built in the tip of the thumb like a microphone 800 of the tip of the thumb in FIG. 11.

The compact microphone may be placed to a different position near a place where operation sounds are generated, such as the tip of the index finger or the back of the hand. The microphone 800 may also be built in multiple positions of the hand.

According to the wearable sensor of the eighth embodiment, when a great noise sound is generated around, a small sound generated at assembly by the thumb of the operator 100 can be detected.

Ninth Embodiment

A wearable sensor of the ninth embodiment is explained below. The ninth embodiment relates to a microphone built in a glove shaped wearable sensor worn by the operator 100 and to a technique of motion sound detection using the built-in microphone.

Figure 12:
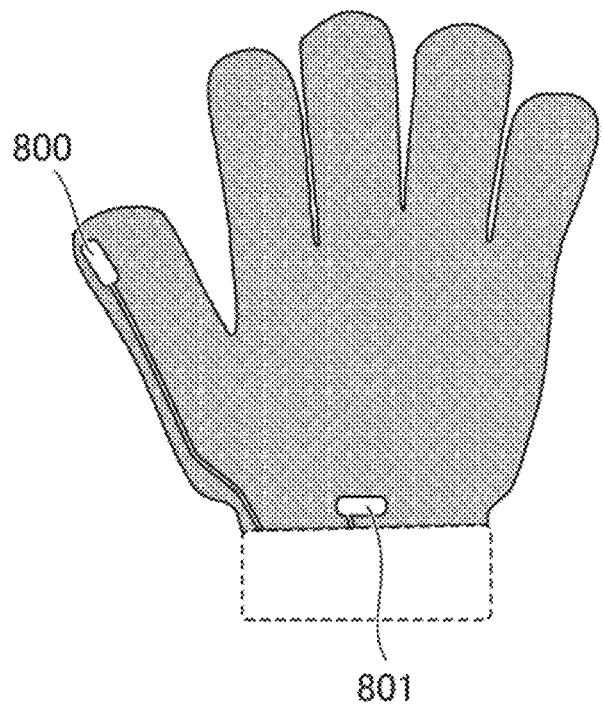
FIG. 12 illustrates an example of a wearable sensor that builds microphones in the thumb fingertip and the back of the hand.

In the ninth embodiment, compact microphones 800 and 801 are built in at least two positions in the glove-shaped wearable sensor 200. For example, the microphone 800 may be arranged to the fingertip as in FIGS. 11 and 12. The microphone 801 may be arranged to a separate position from the fingertip, such as the back of the hand. The volumes of the microphones 800 and 801 for sounds generated by fingertip operations of the operator 100 can be thus extracted. Additionally, the difference in propagations of sounds that emit from sound sources can be extracted.

Figure 13:
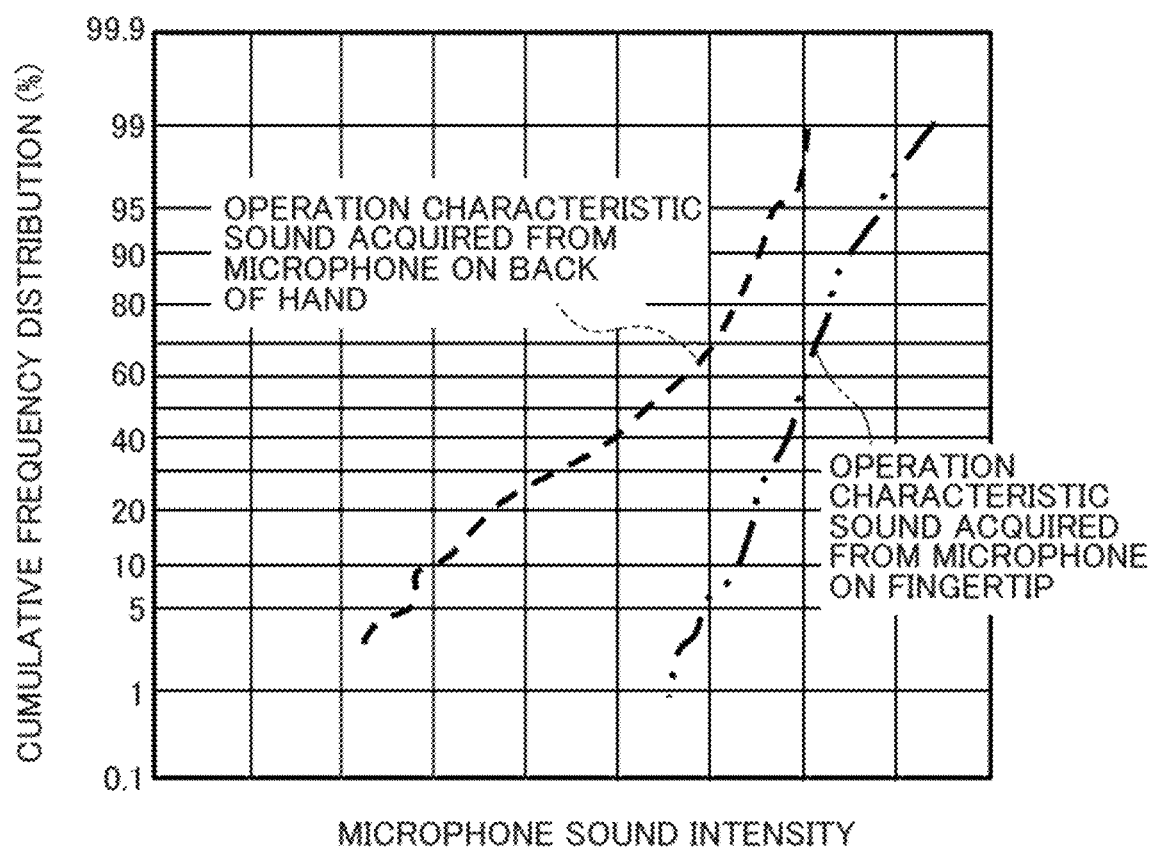
FIG. 13 illustrates distribution of operation characteristic sounds acquired from microphones built in two positions on the wearable sensor.

For example, the intensity of the operation characteristic sound acquired by the microphone 800 on the fingertip is compared to the intensity of the operation characteristic sound acquired by the microphone 801 on the back of the hand. As in FIG. 13, the sound acquired from the fingertip microphone is greater in volume nearer to the sound source.

Figure 14:
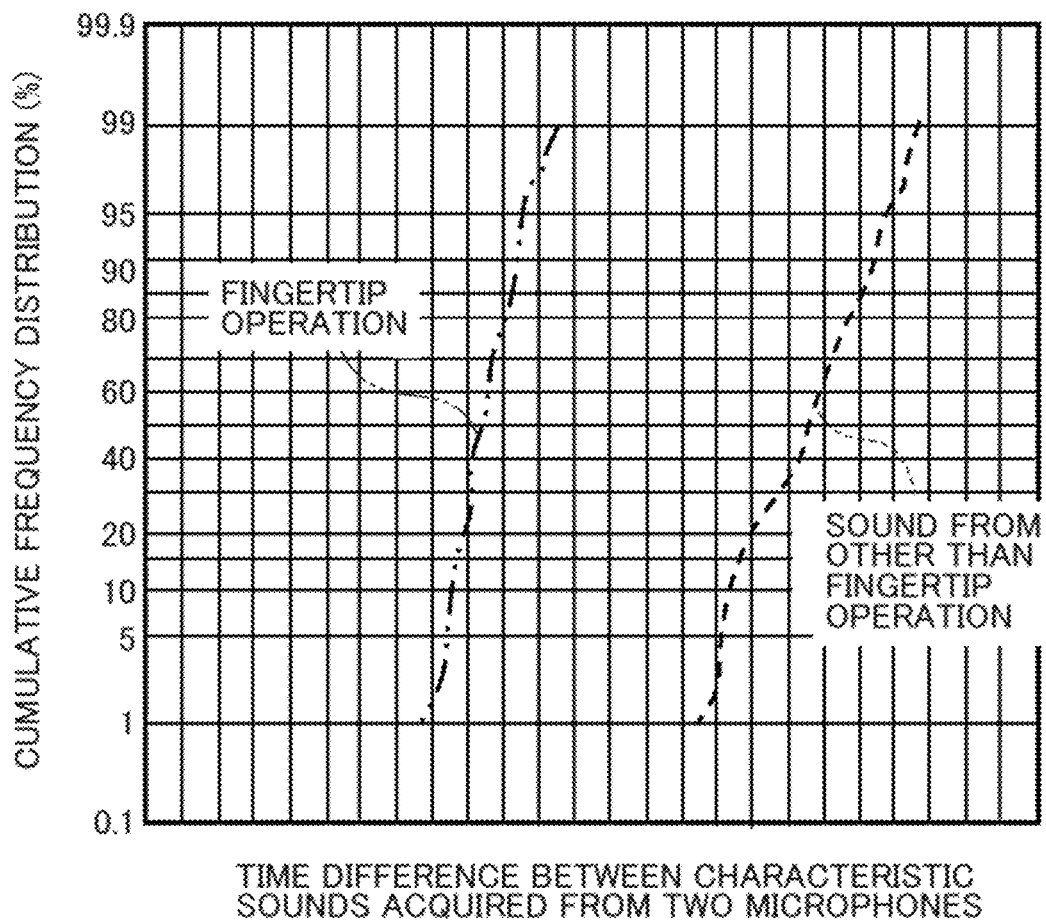
FIG. 14 illustrates a detection time difference of operation characteristic sounds acquired from the microphones built in two positions on the wearable sensor.

The acquisition time difference of operation characteristic sounds acquired from the microphones 800 and 801 is compared to the acquisition time difference of noises similar to the operation characteristic sounds acquired from the microphones 800 and 801. The sound source of the operation sound from the fingertip operation is then nearer to both the two microphones as in FIG. 14. The difference of acquisition times of the operation sounds is thus smaller than the difference of acquisition times of the external noise similar to the operation sound.

According to the wearable sensor of the ninth embodiment, the multiple microphones 800 and 801 are built in the glove shaped wearable sensor 200 to compare the acquired sounds to each other.

The wearable sensor 200 of the eighth and ninth embodiments is worn by the operator 100, has a glove shape, and is mounted to the hand of the operator 100. The wearable sensor 200 has the wearable sensor group 102 including multiple sensors that output multiple sensor information signals of motions of the hand acting on the operation target 101 through contact with the operation target 101. The multiple sensors synchronize times of multiple sensor information signals as a single wireless signal and wirelessly transmit the wireless signal to the outside.

The multiple sensors detect any one of a pressure, sound, and acceleration to collect multiple sensor information signals as a composite signal and wirelessly transmit the signal to the outside as a single wireless signal.

The multiple sensors include at least the microphone 800 that detects an operation sound of the fingertip of the operator 100 and pressure sensors 201 to 203 that detect pressures of fingertip operations of the operator 100. The microphone 800 is built in at least one fingertip of the five fingers of the hand of the operator 100 and detects sounds characteristic of operation contents.

The multiple sensors include at least pressure sensors built in the palm side surfaces of the thumb and index finger of the operator 100. The pressure sensor detects the operation target 101 when the operation target 101 is gripped by the thumb and index finger.

As in the above embodiment, sensing events are accurately detected by sensing events at the same time with multiple different sensors mounted to the body and then comparing the events to each other. Through body motions of the operator acting on an operation target and through contacts with the operation target, operation contents of the operator 100 can be identified. It is possible to determine whether an operation motion of the operator 100 is appropriately performed.

The operations at a manufacturing industry or a maintenance site have been explained as examples in the above embodiments. The use of the present invention is not limited to the above embodiments.

The above embodiments have been explained using hand operations. The wearable sensor in the present invention is not limited to the above embodiments. The wearable sensor may be mounted to part of the leg such as the bottom of the foot or the knee or part of the arm such as the shoulder or the elbow.

In the above embodiments, the wearable sensor has been explained. The wearable sensor is not limited to a sensor mounted to humans. The wearable sensor may be a robot or assembly machine mounting multiple sensors.

(Note)

The above embodiments detect operation contents of an operator to determine whether the contents are normal or abnormal. To solve this problem, in the above embodiments, sensing events are accurately detected by sensing events at the same time point with multiple different sensors mounted to the body and then comparing the events to each other. One example for the determination is described below as notes.

Note 1

An operational information management system includes: a sensor group mounted to the body of an operator; a signal processing portion that conveys information about a body motion acting on an object, the information being acquired from the sensor group through contact of the body; a motion verification portion that combines sensor information collected from each sensor of the sensor group to the processing portion to recognize a specific motion; a signal determination portion that determines whether the motion is normal by comparing a motion around a motion time verified by the verification portion to a predefined motion; and a feedback portion that conveys information from the signal determination portion to the operator or a supervisor as visual, audible, or tactile information.

Note 2

The operational information management system includes, between the signal processing portion and the motion verification portion, a transmission portion that wirelessly transmits sensor information collected from each sensor of the sensor group and a reception portion that receives signals as Note 1.

Note 3

The operational information management system described in Note 2 includes a signal combination portion that combines multiple sensor signals into a composite signal, the transmission portion that transmits the combined signals as a single wireless signal, and the reception portion that receives the signal. After reception, data is provided with times and decomposed to each sensing signal and transmitted to the motion verification portion of one aspect of the present invention.

Note 4

In the operational information management system described in Notes 1 to 3, the sensor group is built in a glove shaped wearable object for the body.

Note 5

In the operational information management system described in Note 4, sensors for pressure, sound, and acceleration are built in a glove shaped wearable sensor worn by an operator to detect each signal.

Note 6

In the operational information management system described in Notes 1 to 5, the multiple sensors mounted to the body capture characteristic signals generated due to a specific motion of the operator. The motion verification portion captures the characteristic signals and simultaneously detects each characteristic signal in a predetermined time range to identify an operation content of the operator.

Note 7

A glove shaped wearable sensor builds in multiple sensors including a microphone and a pressure sensor to synchronize times of multiple signals including an operation sound of the fingertip and a pressure of the fingertip operation.

Note 8

In the operational information management system described in Notes 1 to 8, the microphone built in at least one fingertip of five fingers of the glove shaped wearable sensor worn by the operator detects a sound characteristic of an operation.

Note 9

In the operational information management system described in Notes 1 to 9, the pressure sensor or acceleration sensor of the fingertip also detects, in a predetermined range of a detection time of the built-in microphone, detects a signal indicating a characteristic of the same operation to identify an operation content.

Note 10

In the operational information management system described in Note 9 or 10, microphones are built in at least two positions of the glove shaped wearable sensor worn by the operator. An operation sound is identified using a difference in volume and a difference in propagation property between a microphone sound near a position where an operation sound is generated and a microphone sound at another position.

Note 11

In the operational information management system described in Notes 6, 8, and 9 to 11, pressure sensors are built in the palm side surfaces of at least the thumb and index finger of the glove shaped wearable sensor. An operation target can be detected when gripped by the thumb and index finger.

Note 12

In the operational information management system described in Notes 1 to 6 and 8, when characteristic signals of multiple channels in pressure, sound, or acceleration are received in response to a specific operation of the operator, the characteristic signals are simultaneously detected in a predetermined time period to identify an operation content.

Note 13

In the operational information management system described in Notes 1, 2, 4, 5, 8, 11, and 12, when assuming that the multiple sensors detect signals characteristic of the same operation, the motion verification portion compensates a difference between sensing times of the sensors. The synchronization of the times of the sensors is automatically reset.

Note 14

In the operational information management system described in Notes 1 to 14, a mating sound and a mating operation are detected when connectors for electrical wiring are mated with each other.

What is claimed is:

1. An operational information management system comprising: a plurality of sensors that are mounted to a body of an operator and outputs a plurality of pieces of sensor information about a specific body motion acting on an operation target through contact with the operation target by the body; a motion verification portion that combines and verifies the plurality of sensor information to recognize the specific body motion; a signal determination portion that determines whether an operation content of the operator is normally performed based on the specific body motion recognized by the motion verification portion; and a report portion that reports a determination result of the signal determination portion.

2. The operational information management system according to claim 1 further comprising:
   a signal processing portion that generates a plurality of sensor information signals digitized by processing the plurality of sensor information,
   wherein the motion verification portion recognizes the specific body motion by combining the plurality of sensor information signals generated in the signal processing portion,
   the signal determination portion determines whether the operator motion of the operator is normally performed by comparing the body motion around a motion time verified by the motion verification portion to a predefined body motion, and
   the report portion displays a determination result of the signal determination portion.

3. The operational information management system according to claim 2 further comprising:
   a transmitter that wirelessly transmits the plurality of sensor information signals generated in the signal processing portion; and
   a receiver that receives the sensor information signals wirelessly transmitted from the transmitter and transmits the sensor information signals to the motion verification portion.

4. The operational information management system according to claim 2 further comprising:
   a signal combination portion that combines the plurality of sensor information signals into a composite signal,
   wherein the transmitter wirelessly transmits the sensor information signals combined in the signal combination portion as a single wireless signal, and
   the receiver decomposes the received single wireless signal to the sensor information signals provided with times and then transmits the sensor information signals to the motion verification portion.

5. The operational information management system according to claim 2 wherein
   the sensors built in the wearable object include at least a microphone that detects an operation sound of a fingertip of the operator and a pressure sensor that detects a pressure of a fingertip operation of the operator, wherein the signal processing portion synchronizes times of the plurality of pieces of sensor information including the operation sound of the fingertip and the pressure of the fingertip operation.

6. The operational information management system according to claim 5 wherein
the microphone built in at least one of fingertips of five fingers of the glove shaped wearable object for a body to detect a sound characteristic of the operation content.

7. The operational information management system according to claim 6 wherein
when the pressure sensor or acceleration sensor built in the fingertip detects a signal characteristic of an identical operation content in a fixed range of a detection time of a sound detected by the microphone built in the fingertip, the motion verification portion identifies the operation content of the operator and recognizes the specific body motion.

8. The operational information management system according to claim 7 wherein
the microphone is built in at least two positions of the glove shaped wearable object for the body,
the motion verification portion identifies the operation sound based on a difference in volume and a difference in propagation property between a first microphone sound of a first place near a location where the operation sound is generated and a second microphone sound of a second place different from the first place to identify the operation content of the operator.

9. The operational information management system according to claim 5 wherein
the sensors built in the wearable object include pressure sensors built in at least palm sides of a thumb and an index finger of the operator, and
the pressure sensors detect the operation target when the operation target is gripped by the thumb and the index finger.

10. The operational information management system according to claim 1 wherein
the plurality of sensors are built in a glove shaped wearable object for the body.

11. The operational information management system according to claim 10 wherein
the sensor built in the wearable object detects any one of a pressure, a sound and an acceleration.

12. The operational information management system according to claim 1 wherein
the motion verification portion combines and verifies the plurality of pieces of sensor information, captures a characteristic signal generated by a specific operation of an operator, and simultaneously detects the characteristic signals in a specific time range to identify the operation content of the operator and to thus recognize the specific body motion.

13. The operational information management system according to claim 12 wherein
when assuming that the multiple sensors detect signals characteristic of the same operation, the motion verification portion corrects a difference between sensing times of the sensors to reset synchronization of times of the sensors.

* * * * *